Sept. 29, 1959    A. A. CORNELL ET AL    2,906,852
WELDING METHOD
Filed April 21, 1958

INVENTORS
ARTHUR A. CORNELL
JOHN V. DUNBAR
JAMES H. RUFFNER

BY  *Harry J. McCauley*

ATTORNEY

United States Patent Office 2,906,852
Patented Sept. 29, 1959

2,906,852

WELDING METHOD

Arthur A. Cornell, Wilmington, Del., and John V. Dunbar, Williston, and James H. Ruffner, North Augusta, S.C., assignors, by mesne assignments, to the United States of America as represented by the United States Atomic Energy Commission Application April 21, 1958, Serial No. 729,771

2 Claims. (Cl. 219—61)

This invention relates to a method for the weld joining of ferrous metal pipes and fittings, and particularly to a method for the weld joining of circular cross section pipes and fittings which utilizes the inert gas-shielded consumable electrode electric arc welding technique.

Various welding machines have been developed in the past which have had for their objective the weld joining of lengths of pipe one to another, or to fittings, representative designs being disclosed in U.S. Patents 1,907,702, 2,110,632 and 2,135,129. These machines have utilized either gas flame welding or tungsten arc welding techniques, both of which are disadvantageous, in that the heat liberated at the welding site is too widely distributed to produce good results. Under the circumstances, the opposed butt ends of the fittings were overheated, and usually to different degrees, producing warp distortion lengthwise of the sections joined. In addition, the welds produced were not consistent in quality, often being porous, obtruded to a greater or lesser degree inwardly from the inside peripheries of the elements joined into the flow channel and of variable strength. Accordingly, semi-automatic methods of welding have not been adopted in the art and it has been the universal practice to rely on hand welding techniques up to this day, even though hand welding is extremely high in cost and not at all uniform in the product quality obtained.

Figure 1:
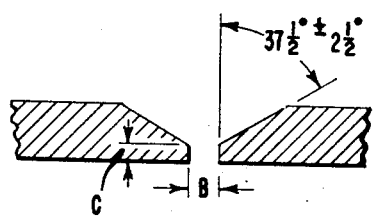
Figure 2:
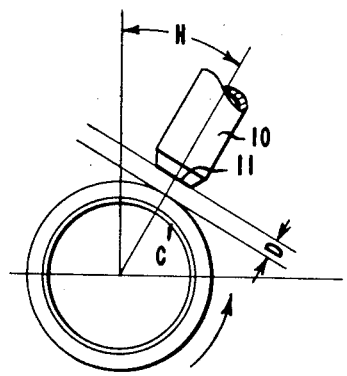
Figure 3:
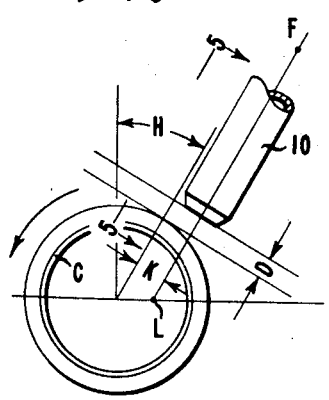
Figure 4:
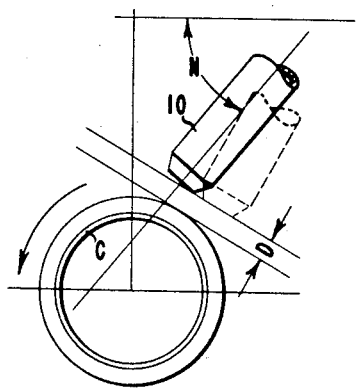
Figure 5:
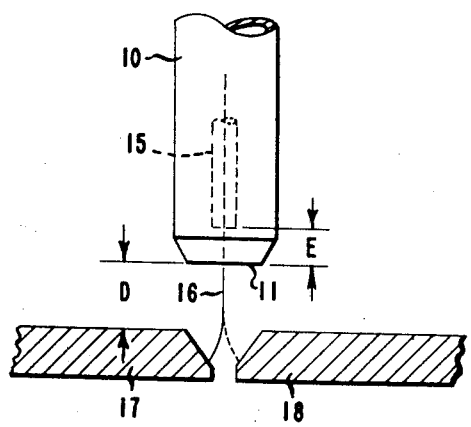

A primary object of this invention is to provide a semi-automatic method for the weld joining of pipes and fittings which utilizes the inert gas-shielded consumable electrode electric arc welding technique. Another object of this invention is to provide a method for weld joining pipes and fittings which produces welds of extremely high quality consistently, which is rapid in operation, and which, in many cases, obviates the necessity for preliminary tack welding of the elements as required by the prior art. Yet other objects of this invention will become apparent from the detailed description and the following drawings, in which:

Fig. 1 is a schematic representation of a typical weld bevel which elements to be joined according to this invention are provided with preliminary to welding, Fig. 2 is a diagrammatic representation looking axially of the elements to be welded of the first step in setting up the welding head with respect to the work in order to lay down the root pass, one of the members to be joined being omitted from this showing and also from Figs. 3 and 4 for purposes of clarity, Fig. 3 is a diagrammatic representation of the final step in setting up the welding head with respect to the work to be welded in order to lay down the root pass, Fig. 4 is a diagrammatic representation of the setting of the welding head with respect to the work to be welded in order to lay down one or more filler passes on top of the root pass of Figs. 2 and 3, and Fig. 5 is a section on line 5—5 of Fig. 3 illustrating the bridging movement of the electrode wire occurring in the course of welding according to this invention.

Generally, the method of weld joining pipes and fittings according to this invention comprises laying down the root pass by revolving the pipes and fittings to be joined at a first substantially constant peripheral velocity past a stationary welding head disposed in a first position with longitudinal axis directed towards the pipes and fittings along a line parallel to a radius drawn from the center of rotation inclined from the vertical at the top point of rotation opposite to the direction of rotation of the pipes or fittings an angle of about 23° and spaced normally from said radius in a direction opposite to rotation a slight additional distance dependent on the size of the pipes or fittings being welded, and thereafter laying down such filler passes over the root pass as may be necessary to complete the weld by revolving the pipes and fittings at a substantially constant second peripheral velocity past the stationary welding head which, for this operation, is disposed in a second position exactly the same as the first position, referred to the existing direction of rotation, as employed for laying down the root pass but with the welding head longitudinal axis inclined from said first position in the direction of rotation of the pipes and fittings at an angle varying from about 20 minutes to about 4 degrees.

The objective of this invention is to produce welds of a quality consistently meeting the requirements of ASME Broiler and Pressure Vessel Code, 1956, section VIII—Unfired Pressure Vessels, paragraph UW51. In addition, the code is to be met without the use of back-up rings bridging the root of the weld bevel in the course of welding. Yet other requirements are that the inside diameter reinforcement of weld metal is limited to 0″ to $+\frac{1}{16}''$ while at the same time obtaining 100% penetration of the weld metal in the section and throughout the full periphery of the welded joint, and that the necessity for tack welding for temporary axial alignment of elements to be joined is eliminated wherever possible.

It is standard practice in the welding art to prepare pipes and fittings to be weld joined with a bevel at the ends, and the industry has standardized on a $37\frac{1}{2}°\pm2\frac{1}{2}°$ bevel of the cross section shown in Fig. 1. This standard is prescribed in American Standards Association, Booklet 16.5, entitled "Steel Pipe Flanges and Flanged Fittings," the $37\frac{1}{2}°$ bevel with tolerance specified being for wall thicknesses of $\frac{3}{4}''$ or less. It will be noted that the weld bevel is terminated at somewhat less than full wall thickness, leaving a land C which is of a thickness $\frac{1}{16}''+\frac{1}{32}''-0''$, irrespective of wall thickness. The root gap B constituting the predetermined separation between parts to be joined by welding is prescribed as $\frac{1}{16}''+\frac{1}{32}''-0''$, again irrespective of wall thickness. The method of welding according to this invention is adapted to produce high quality welds when the foregoing specifications are adhered to.

Referring to Figs. 2 and 3 particularly, welding is accomplished according to this invention by first laying down the root pass, by which is meant the initial metal of the joint which fills up root gap B of Fig. 1, preferably flush with the inside surface of the pipes or fittings joined, and uniformly distributed around the entire circumference of the pipes or fittings. The laying down of the root pass is an extremely critical operation, because a direct opening exists into the inside of the pipes and fittings to be joined and, of course, the weld metal is at its most fluid state in the immediate zone of the arc, so that displacement under the influence of gravity must be taken account of by adopting conditions of operation such that the quality of the weld is not impaired. We have found that this can be accomplished by disposing the welding head in a first critical orientation while laying down the root pass, and in yet another critical orientation while completing the joint with the one or more filler passes necessary to finish the weld.

At the outset, welding according to this invention employs the inert gas-shielded consumable electrode arc welding technique, a suitable apparatus for the purposes being the "Aircomatic" welding equipment marketed by the Air Reduction Company. In this welding technique, the welding head may conveniently comprise an outer tube or barrel 10 which is open at end 11 and is utilized to flood the welding zone with an inert gas, such as helium, argon, or the like. The welding head contact tube is shown in broken line representation at 15, Fig. 5, which tube is fabricated from electrically conductive material and is mounted generally concentric with tube 10. The consumable electrode 16 is a relatively small gage wire which is fed continuously by pinch wheels (not shown) into the welding zone and, welding current being supplied to the wire through connectors in the apparatus, not further described herein because not related to this invention, there is created an electric arc extending from the point of the wire across the small gap maintained automatically by the welding apparatus to the members to be welded together, 17 and 18. The construction of the apparatus is such that the end of welding wire 16 is made to oscillate continuously from one element 17 to the other element 18, and then in the reverse direction, so that heat is applied more or less uniformly to first one of the members and then to the other. For the purposes of this invention we have found that a clearance E of $3/16'' + 0'' - 1/32''$ between tube 15 and tube end 11 gives good results in practice.

The practice of this invention requires precise positioning of the welding head with respect to the work, and this can be conveniently achieved by mounting the two members to be joined in opposed chucks, each of which is power-driven at the same speed, utilizing steady rests provided with idler rollers to afford intermediate support for the members where necessary. The welding head is preferably positioned overhanging the adjacent ends of the members to be joined by welding, a universal clamp or the equivalent being a suitable support. A number of designs of machines especially adapted to the weld joinder of rotating pipes and fittings by rotation of the work while holding the head stationary exist or can be developed from known constructions with some modifications, examples being those disclosed in U.S. Patents 1,907,702, 2,110,632 and 2,135,129, and adaptations of these machines can be utilized for the purposes of this invention, or a modified lathe can be employed if desired.

Where relatively light fittings or short pipe lengths are to be joined together we have found that it is not necessary to tack-weld the members preliminary to joinder because the lay down of metal in the root pass creates an immediate bond which possesses sufficient strength to constitute a coupling between the members which retains the members against any relative displacement which could adversely affect the weld. This is, of course, advantageous since the welding process is simplified by elimination of preparatory operations and, at the same time, there occurs a self-aligning action which produces better welded assemblies.

We have found that the inclination of the longitudinal axis of the welding head with respect to the work is highly critical to the production of good quality welds. With counterclockwise rotation of the work as shown in Figs. 2 and 3, the welding head is oriented as follows for lay down of the root pass as the first operation. The orientation of the welding head for the laying down of the root pass can be conveniently achieved in two separate adjustments, the first being represented in Fig. 2 and the second in Fig. 3. Referring to Fig. 2, we have found that an inclination H of the longitudinal axis of the welding head equal to an angle of about 23° referred to the longitudinal axis of the pipes or fittings being welded as center and measured from the vertical at the top point of rotation of the pipes and fittings is essential. In addition, tube end 11 should be spaced outwardly from the line tangent to the point of intersection of the line of inclination H with the outside periphery of the members to be joined a distance D of about $1/2''$. The second adjustment, illustrated in Fig. 3, consists of shifting the longitudinal axis of the welding tube normally of the line of inclination H and opposite to the direction of rotation to a parallel position FL a distance K ranging linearly from about $5/16''$ for pipes or fittings of 2" to 6" nominal inside diameter to about $9/16''$ for pipes or fittings of 10" nominal inside diameter and about $15/16''$ for 12" nominal inside diameter size, following which the root pass is laid down without thereafter changing the position of the welding head.

The root pass is laid down in a single revolution of the members to be weld joined, a substantially constant peripheral speed of about 19" to about 37" per minute being employed, this speed varying inversely with the diameter of the work to be welded and with the wall thickness corresponding to the particular applicable pipe schedule. As regards this defined range of peripheral speeds, it will be understood that a progressively increased electrode wire feed is necessary in going from pipes and fittings of a given schedule (i.e., wall thickness) having a relatively small inside diameter to those of larger diameter, although a linear relationship has not been found to exist between pipe diameter and optimum electrode wire feed, as will be apparent from the welding data table hereinafter set forth. Also, somewhat higher operating voltages are required for the larger pipe sizes, typical settings in terms of percent of available range utilized being given in the "Increment Volt Control (Percent Range)" column of the welding data table. Preferably, the apparatus by which the welding is performed is provided with a conventional cycle controller which shuts off the power to the welding head immediately after one complete revolution of the members to be joined, so that the operation can be readily controlled by an attendant on a semi-automatic basis.

Upon the conclusion of lay down of the root pass, the operator must orient the welding head to a new position in order to lay down the successive filler passes required to complete the weld. As shown in Fig. 4, the change of orientation of the welding head for filler pass work is readily effected, and consists merely of shifting the longitudinal axis of welding tube 10 a small angle of about 20 minutes to about 40 in the direction of work rotation from the orientation (shown in broken line representation) required for root pass lay down. This filler pass orientation is represented in Fig. 4 by the angle N measured from the horizontal to the longitudinal axis of tube 10, this angle varying from about 63°–4' to about 66°–43' as shown in the welding data table hereinafter set forth. It will be seen that the setting for laying down filler passes is very quickly made if the same direction of work rotation is preserved for finishing the weld as was utilized for starting it, as is usually the case. However, there is no reason why the direction of work rotation might not be reversed, whereupon the axis of the welding tube would be disposed on the opposite side of the vertical, although at the same angle therefrom as shown in Fig. 4. This particular method of operating is brought out in the claims by specifying the filler pass position of the welding head as adjusted from the root pass position corresponding to the specific direction in which the work would be revolved if the root pass had been made in the same rotational sense as the filler passes.

Since a relatively greater quantity of metal must be furnished in the filler passes, as compared to the root pass, due to the fact that the open volume of the weld bevel (refer Fig. 1) increases the farther removed the arc is radially from the center of the pipes, a lower peripheral velocity of the members to be welded is required for filler lay down, the preferred speed being in the range of about 10" to about 23". Appropriate electrode wire feed rates for filler pass work on a given pipe or fitting size are usually slightly less than those preserved for the root pass but, in general, differ therefrom by not more than about 25%.

Typical welding head orientations for the weld joinder of members of seven different nominal internal diameters of pipe are set forth in the following welding data table. This particular table is based on completed welds made in 276 instances, 180 of which involved the joinder of ASTM A-53 (Welded and Seamless Steel Pipe), ASTM A-106 (Seamless Carbon-Steel Pipe for High-Temperature Service) and S.A.E. 1035 carbon steel (containing 0.37% carbon), whereas 96 were A.I.S.I. Type 304 stainless steel (classified as a low carbon 18% Cr-8% Ni steel). The welded specimens produced at the settings tabulated met the standards of the ASME Boiler and Pressure Vessel Code fully. Hundreds of other welds were made in confirmation of the reported settings, but on miscellaneous sizes, schedule weights, material compositions and the like, and these are not therefore included in the tabulation. All of the welds were of the same high quality as determined by visual and radiographic inspection both outside and inside, and also in sawed cross section.

All of the specimens tabulated in the welding table were provided with the same standard weld bevel of 37½°±2½°. In addition, the root gap dimension B was the same for all, namely, 3/64", as was the welding head-pipe clearance D, which was ½", and the angle H, which was 23°.

chucks, removing the welded assembly from the machine and making the appropriate settings of the welding head, together with the corresponding choice of electrode wire feed as set out in a master chart such as that represented by the welding table hereinbefore set forth. Where more than one filler pass is required to complete a particular weld the attendant is required to exercise some judgment as to the required placement of the welding head along the longitudinal axis of the parts joined by welding; however this involves merely proportioning approximately evenly the metal laid down during each cycle of filler pass rotation.

The method of this invention has proved beneficial in construction, making it possible to make up relatively complicated subassemblies of pipes and fittings at a central location under shelter, after which the subassemblies can be transported to the required field locations and put in place by only one or two field welds, which has proved saving of time and effort as well as contributory to higher quality standards overall.

From the foregoing, it will be apparent that we have provided a welding method which is productive of high quality welds consistently and which utilizes conventional apparatus for its practice, which method can be varied relatively widely within the skill of the art without departure from its essential spirit, so that it is desired to be limited only within the scope of the invention as claimed.

What is claimed is:

1. The method of weld joining ferrous metal pipes and

| Nominal Pipe Dia., Inches | Wall Thickness, Inches | Pipe Schedule | Land ("C" of Fig. 1), Inches | Welding Head Offset (Inch) K | Filler Pass Angle (Degrees) N | Peripheral Work Speed (inches/min.) | Electrode Wire Feed Rate (inches/min.) | Voltage Range | Increment Volt Control (percent range) | Sequence of Passes |
|---|---|---|---|---|---|---|---|---|---|---|
| 2 | 0.154 | 40 | 5/64 | 5/16 | 66°—43' | 36.2 | 255 | 25–31 | 25 | #1 |
|   |       |    |      |      |         | 23.3 | 300 | 25–31 | 35 | #2 |
| 2 | 0.218 | 80 | 3/32 | 5/16 | 66°—43' | 31   | 356 | 25–31 | 35 | #1 |
|   |       |    |      |      |         | 20   | 267 | 25–31 | 40 | #2 |
| 3 | 0.216 | 40 | 5/64 | 5/16 | 66°—23' | 36.7 | 398 | 25–31 | 45 | #1 |
|   |       |    |      |      |         | 20.0 | 316 | 25–31 | 50 | #2 |
|   |       |    |      |      |         | 34   | 397 | 25–31 | 50 | #1 |
| 3 | 0.300 | 80 | 3/32 | 5/16 | 66°—23' | 20   | 316 | 25–31 | 60 | #2 |
|   |       |    |      |      | 66°—23' | 18   | 316 | 25–31 | 60 | #3 |
| 4 | 0.237 | 40 | 3/32 | 5/16 | 66°—9'  | 36.2 | 442 | 25–31 | 50 | #1 |
|   |       |    |      |      |         | 18.7 | 308 | 25–31 | 70 | #2 |
|   |       |    |      |      |         | 36.2 | 448 | 25–31 | 50 | #1 |
| 4 | 0.337 | 80 | 3/32 | 5/16 | 66°—9'  | 18.7 | 359 | 25–31 | 70 | #2 |
|   |       |    |      |      | 66°—9'  | 15.0 | 359 | 25–31 | 70 | #3 |
| 6 | 0.280 | 40 | 3/32 | 5/16 | 65°—35' | 33.0 | 463 | 25–31 | 50 | #1 |
|   |       |    |      |      |         | 18.1 | 398 | 25–31 | 80 | #2 |
|   |       |    |      |      |         | 33   | 468 | 25–31 | 50 | #1 |
| 6 | 0.432 | 80 | 3/32 | 5/16 | 65°—35' | 15   | 395 | 25–31 | 80 | #2 |
|   |       |    |      |      | 65°—35' | 12   | 395 | 25–31 | 80 | #3 |
| 8 | 0.250 | 20 | 3/32 | 7/16 | 64°—44' | 36   | 495 | 25–31 | 40 | #1 |
|   |       |    |      |      |         | 20   | 395 | 25–31 | 70 | #2 |
| 8 | 0.322 | 40 | 3/32 | 7/16 | 64°—44' | 32.8 | 496 | 25–31 | 50 | #1 |
|   |       |    |      |      |         | 12.1 | 398 | 25–31 | 90 | #2 |
|   |       |    |      |      |         | 30   | 496 | 25–31 | 60 | #1 |
| 8 | 0.500 | 80 | 3/32 | 7/16 | 64°—44' | 12   | 415 | 25–31 | 80 | #2 |
|   |       |    |      |      | 64°—44' | 10   | 415 | 25–31 | 100 | #3 |
| 10 | 0.307 | 30 | 3/32 | 9/16 | 63°—36' | 35 | 468 | 25–31 | 70 | #1 |
|   |       |    |      |      |         | 15 | 397 | 25–31 | 90 | #2 |
| 10 | 0.365 | 40 | 3/32 | 9/16 | 63°—36' | 27 | 463 | 25–31 | 40 | #1 |
|   |       |    |      |      |         | 15 | 398 | 25–31 | 100 | #2 |
|   |       |    |      |      |         | 20 | 418 | 25–31 | 50 | #1 |
| 12 | 0.375 | 40 | 3/32 | 15/16 | 63°—4' | 13.2 | 358 | 25–31 | 60 | #2 |
|   |       |    |      |      | 63°—4'  | 12.2 | 316 | 25–31 | 100 | #3 |
|   |       |    |      |      |         | 19 | 421 | 25–31 | 60 | #1 |
| 12 | 0.531 | 60 | 3/32 | 15/16 | 63°—4' | 12 | 359 | 25–31 | 70 | #2 |
|   |       |    |      |      | 63°—4'  | 10 | 316 | 25–31 | 80 | #3 |
|   |       |    |      |      | 63°—4'  | 10 | 316 | 25–31 | 100 | #4 |

As explained prefatory to the tabulation the method of this invention has been employed with complete success in the welding of pipes and fittings fabricated from a wide variety of materials, it being understood that the electrode wire employed with each material was, in all cases, of the same composition, or so close thereto as to be an equivalent material, all as prescribed in good welding procedure.

In practice, welding by our method can be performed by persons completely untrained in the manual welding trade, since the only activity required by the attendant is that of mounting the members to be welded in the fittings of substantially circular cross sections and provided at the ends to be joined with appropriate weld bevels by the inert gas-shielded consumable electrode arc welding technique comprising in sequence revolving said pipes and fittings at a substantially constant first peripheral velocity in the range of about 19 to 37 inches/minute about a horizontal axis drawn through the centers of said cross sections at said ends to be joined, laying down the root pass with electrode wire feed proportioned to said first peripheral velocity over the full circumference of said weld bevels while maintaining the welding head in a first position directed toward the center of said pipes and fittings with the longitudinal axis of said welding head disposed parallel to a line radial of said pipes and fittings and inclined at an angle of about 23° measured from the vertical at the top point of rotation in a direction opposite to that of said revolving but with the welding head tip displaced outwardly from the line tangent to the point of intersection of said first-mentioned line with the outside periphery of said pipes and fittings a distance of about ½" and additionally with said longitudinal axis displaced normally from said first-mentioned line in a direction opposite to that of said revolving a distance between about 5/16" for pipes or fittings of 2" to 6" nominal I.D. to about 9/16" or more for pipes or fittings of 10" or greater nominal I.D., and thereafter laying down the filler passes over said root pass necessary to complete said weld by revolving said pipes and fittings at a substantially constant second peripheral velocity in the range of about 10 to 23 inches/minute with electrode wire feed proportioned to said second peripheral velocity while maintaining said welding head in a second position identical with said first position, referred to the specific direction of said revolving, except that said longitudinal axis of said welding head is disposed angularly in the direction of said revolving an amount between about 20 minutes and about four degrees from said first position.

2. The method of weld joining ferrous metal pipes and fittings according to claim 1 wherein the direction of revolving said pipes and fittings is the same for laying down said filler passes as it is for laying down said root pass.

References Cited in the file of this patent
UNITED STATES PATENTS

| | | |
|---|---|---|
| 1,485,120 | Lincoln | Feb. 26, 1924 |
| 2,427,350 | Carpenter et al. | Sept. 16, 1947 |

UNITED STATES PATENT OFFICE

CERTIFICATE OF CORRECTION

Patent No. 2,906,852                                        September 29, 1959

Arthur A. Cornell et al.

It is hereby certified that error appears in the printed specification of the above numbered patent requiring correction and that the said Letters Patent should read as corrected below.

Column 2, line 26, for "Broiler" read -- Boiler --; column 4, line 46, for the numeral "40" read -- 4° --; columns 5 and 6, Tabulation table, all of the data listed in the last denoted Nominal Pipe Dia., 3 inches, Pipe Schedule 40, reading "34  397  25-31  50  #1" should be displaced one line downward so as to be within the enclosure of the next following bracket relating to 3" diameter pipe, Schedule 80; same Tabulation table, eighth column thereof, eleventh item therein, the indistinct numeral should read -- 358 --; same Tabulation table, the sixth entry from the right, last line of data relating to 6" Nominal Pipe Dia., Schedule 80, is indistinctly printed, but should read -- 65°-35' --.

Signed and sealed this 22nd day of March 1960.

(SEAL)
Attest:

KARL H. AXLINE
Attesting Officer

ROBERT C. WATSON
Commissioner of Patents